United States Patent

[11] 3,620,467

[72] Inventor Warren Rex Isom
Indianapolis, Ind.
[21] Appl. No. 855,003
[22] Filed Sept. 3, 1969
[45] Patented Nov. 16, 1971
[73] Assignee RCA Corporation

[54] ENDLESS LOOP TAPE CARTRIDGE
2 Claims, 2 Drawing Figs.

[52] U.S. Cl. .......... 242/55.19A, 226/181
[51] Int. Cl. .......... B65h 17/48
[50] Field of Search .......... 242/55.17 55.21, 197-209; 226/181-183

[56] References Cited
UNITED STATES PATENTS
3,511,449 5/1970 Mathus et al. .......... 242/55.19

*Primary Examiner*—Leonard D. Christian
*Attorney*—Eugene M. Whitacre

ABSTRACT: An endless loop tape cartridge for use with a cartridge tape player includes an intermediate pressure roller adapted to be driven by the tape player capstan. A cartridge capstan, having a smaller diameter than the intermediate pressure roller, is secured for rotation therewith. The withdrawn cartridge tape is driven by the cartridge capstan and passes between the cartridge capstan and a secondary pressure roller prior to being wound around the outermost convolution of the cartridge tape roll.

INVENTOR
WARREN REX ISOM
BY David E. Pitchenik
ATTORNEY

ENDLESS LOOP TAPE CARTRIDGE

The present invention relates to tape cartridges, and more particularly, to tape cartridges adapted for use with an endless loop of magnetic tape.

In the use of tape cartridges of the type containing an endless loop of magnetic tape spirally wound around the hub of a reel or turntable, as for example the eight-track stereotype tape cartridge, it has been common practice to drive the tape across external transducer means 3¾ inches per second. This speed is desirable for the reproduction of high-fidelity tape recordings. However, where high fidelity is not necessary, as for example in the playback of spoken words, a substantially reduced tape speed is desirable because it permits a longer playing time for a given amount of magnetic tape. The reduction of tape speed for spoken word recordings is also desirable because of the high cost of the lubricated tape used in many endless loop tape cartridges. Unfortunately, most of the cartridge tape players are designed to drive the magnetic tape at only one speed, 3¾ inches per second.

It is an object of the present invention to provide an improved tape cartridge which permits the magnetic tape to be driven across a transducer means at a reduced speed without the necessity of introducing any modification in the cartridge tape player.

An endless loop tape cartridge includes a rotatably mounted annular hub member containing a roll of spirally wound tape. During operation of the cartridge, the hub and roll of tape are rotated as the innermost convolution of the tape is drawn out from around the hub and passed across the forward portion of the cartridge for cooperative engagement with an external transducing means. A tape-driving means embodying the present invention includes a first pressure roller adapted to be driven by a tape player capstan. A cartridge capstan having a different diameter than the first pressure roller is secured for rotation with the first pressure roller. The withdrawn tape is passed between the cartridge capstan and a second pressure roller to be driven by the cartridge capstan.

Figure 1:
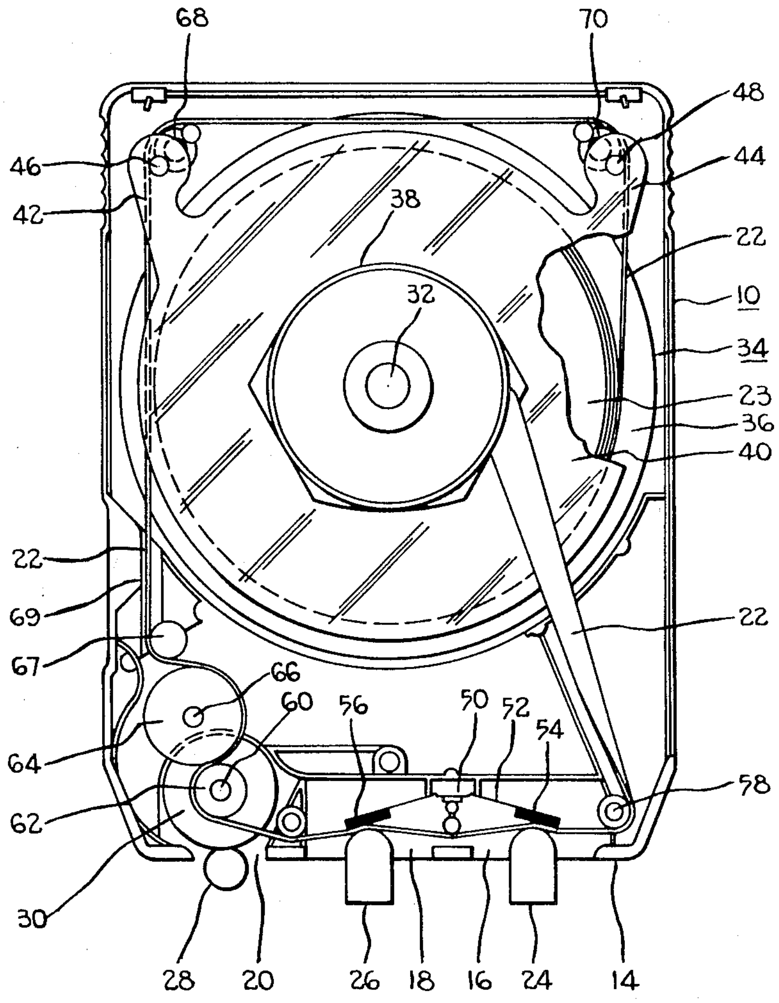
Figure 2:
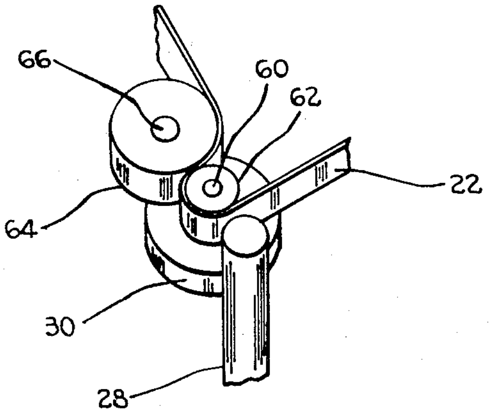

A complete understanding of the invention may be obtained from the following detailed description thereof, when taken in conjunction with the accompanying drawing, in which:

FIG. 1 is a plane view partially broken away of an endless loop tape cartridge having the cover portion removed and embodying the present invention; and FIG. 2 is a perspective view of the magnetic tape drive means shown in FIG 1.

Referring to the drawing where like reference numerals designate like parts in the various FIGS., and more particularly, to FIG. 1, an endless loop tape cartridge includes a rectangularly shaped case 10. The front or forward end 14 of the cartridge has three rectangular apertures 16, 18, and 20 extending from right to left as viewed in FIG. 1. Apertures 16 and 18 allow a magnetic tape 22 to be exposed to operative contact with an erase or track-sensing head 24 and a record-playback head 26. Aperture 20 allows a tape player capstan 28 to engage an intermediate pressure roller 30.

An upright spindle 32 serves as a bearing for a tape reel or turntable 34. The tape reel 34 includes a circular bottom plate 36 and an integrally formed tapered hub 38 about which the magnetic tape 22 is spirally wound. The reel 34 is rotatably mounted on the spindle 32. An annular tape-retaining disc 40 is disposed about the top portion of the hub 38 and spaced from the top edge of the spiralled roll of tape 23 by means of projections 42 and 44 of the annular disc 40 which are secured to notched studs 46 and 48. The notched studs 46 and 48 project upwardly from the bottom portion of the casing 10. Cutouts are provided in the disc 40 to guide the tape from the inner convolution of the tape roll 23. The annular disc 40 retains the spiralled tape roll 23 should the cartridge be turned with its topside down.

Upstanding from the bottom portion of the casing and spaced in from the front wall 14 is a pillar 50 supporting a spring member 52 having a pair of felt-padded arms 54 and 56 in alignment with apertures 16 and 18, respectively. Spaced to the right of the pillar 50 is a tape guide post 58, and to the left of the pillar 50, spaced behind the aperture 20, is an upright post 60 on which the intermediate pressure roller 30 is rotatably mounted.

When the cartridge is inserted into a tape player, the padded arms 54 and 56 effect a resilient engagement of the exposed tape with the apparatus erase or sensing head 24 and the record-playback head 26, respectively, while the intermediate pressure roller presses against the player capstan 28 and is frictionally driven.

As is more clearly shown in FIG. 2, a capstan 62 is rotatably mounted within the tape cartridge on upright post 60 and secured to the intermediate pressure roller 30 for rotation therewith. The magnetic tape 22 passes around a portion of the cartridge capstan 62 and is urged against the capstan by a secondary pressure roller 64. The secondary pressure roller 64 is rotatably mounted on an upright post 66. The height of the intermediate pressure roller 30 is smaller relative to the height of the cartridge capstan 62 to prevent misalignment between the recording tracks of the tape and the cartridge player transducer heads.

In typical cartridge tape players, the capstan drive 28 is fabricated of steel. Consequently, it is necessary to fabricate the intermediate pressure roller 30 from a material which will develop sufficient friction when engaged with the player capstan to insure that the pressure roller 30 will be positively driven without slippage. A rubber-type material having a durometer of approximately 90 has been found to be quite satisfactory. Moreover, the friction developed between the magnetic tape 22 and the cartridge capstan 62 must be sufficient to provide a positive drive to the tape, notwithstanding its contact with the lubricated side of the tape 22. A cartridge capstan fabricated from a rubber-type material similar to the one mentioned above has also been found to be quite satisfactory. The secondary pressure roller 64 may be fabricated from a less expensive plasticlike material. The material should be be compliant so that the periphery of the secondary pressure roller 64 will align itself with the periphery of the cartridge capstan 62. However, the secondary pressure roller 64 must impart a sufficient force to urge the tape 22 against the cartridge capstan to develop sufficient friction therebetween for a positive drive of the tape.

In operation, the player capstan 28 drives the intermediate pressure roller 30 and the cartridge capstan 62 secured thereto. The magnetic tape 22 which is passed between the secondary pressure roller 64 and the cartridge capstan 62 is frictionally driven by the cartridge capstan. The tape path, during operation of the cartridge and after it has been withdrawn from the tape roll 23, is around tape guide post 58, across the transducer heads 24 and 26, around cartridge capstan 62 and a portion of the secondary pressure roller 64, around tape guide post 67, and through slot 69, and hence around tape guide posts 68 and 70 prior to being wound around the outermost convolution on the tape roll 23.

The tape cartridge can be modified to eliminate tape guide post 67 and slot 69. In such case, the tape 22, after it leaves contact with the secondary pressure roller 64, rests against the periphery of the tape roll 23 prior to passing around tape guide post 68. Substantially no friction develops between the tape 22 and the tape roll 23 since the entire length of the endless loop of magnetic tape 22 is moving at the same linear speed. Specifically, the tape and the tape roll are moving at the same linear speed in the same direction.

By varying the diameters of the capstan 62 and the intermediate pressure roller 30, the speed at which the magnetic tape 22 is drawn across the transducer heads, and hence, the amount of playing time for a given amount of magnetic tape can be controller. This, notwithstanding the fixed capstan speed of the typical cartridge tape player.

In many eight-track stereo-type endless loop tape cartridges, the pressure roller which engages the player capstan is driven by the player capstan at a peripheral speed of 3¾ inches per second. That is, the periphery of the player capstan is driven at 3¾ inches per second which is imparted to the cartridge tape and cartridge pressure roller. One satisfactory tape speed for spoken word recordings which provides adequate fidelity is 1⅞ inches per second. This speed can be achieved by making the diameter of the cartridge capstan 62 one-half the diameter of the intermediate pressure roller 30. In this manner, the 80 minutes playing time of the conventional eight-track stereo-type endless loop tape cartridge can be extended to 160 minutes of playing time.

The cartridge may be fabricated with a small space existing between the cartridge capstan 62 and the secondary pressure roller 64 to facilitate the loading of the magnetic tape into the cartridge. This space may be provided by introducing a controlled amount of clearance between the inside diameter of the cartridge capstan 62 and the post 60. In loading the cartridge, the tape 22 may be dropped between the cartridge capstan 62 and secondary pressure roller 64 or pulled around the cartridge capstan to introduce a slack loop between the capstan 62 and guide post 67. In the latter case, the secondary pressure roller 64 is secured for rotation on guide post 66 after the slack loop is formed. When the cartridge is inserted into a cartridge tape player, the player capstan 28 urges the intermediate pressure roller 30 and, hence, the cartridge capstan 62 toward the rear of the cartridge. The movement of the cartridge capstan 62 causes the tape 22 to be pinched between the secondary pressure roller 64 and the cartridge capstan. Alternatively, the loading of the tape 22 between the pressure roller 64 and the capstan 62 may be achieved by providing a movable secondary pressure roller spring biased against the cartridge capstan. In such case, the pressure roller is retracted to permit insertion of the tape.

What is claimed is:

1. In an endless loop tape cartridge of the type including a rotatably mounted annular hub member containing a roll of tape spirally wound therearound and wherein during operation of the cartridge, the hub and roll of tape are rotated and the innermost convolution of the tape is drawn out from around the hub and passed across the forward portion of the cartridge for cooperative engagement with an external transducing means, a tape drive means comprising:
   - a first pressure roller fabricated from a rubberlike material and adapted to be driven by a tape player capstan;
   - a cartridge capstan fabricated from a rubberlike material and secured for rotation with said first pressure roller, said cartridge capstan diameter one-half the diameter of said first pressure roller;
   - a second pressure roller fabricated from a plasticlike material; and
   - said withdrawn tape passing between said cartridge capstan and said second pressure roller to be driven by said cartridge capstan.

2. A tape drive means as defined in claim 1 wherein said cartridge capstan and said second pressure roller are positioned within said tape cartridge with a space therebetween such that when said cartridge is inserted into a cartridge player with the player capstan bearing against said first pressure roller, said first pressure roller and said cartridge capstan displace toward said second pressure roller to pinch said withdrawn tape between said cartridge capstan and said second pressure roller.

* * * * *